United States Patent [19]

Yoshida et al.

[11] Patent Number: 4,959,598
[45] Date of Patent: Sep. 25, 1990

[54] METHOD AND APPARATUS FOR CONTROLLING TORQUE OF A DOOR OPENING AND CLOSING MOTOR FOR AN AUTOMATIC DOOR

[75] Inventors: Yukio Yoshida, Namerikawa; Akiyoshi Takimoto, Toyama; Shigenobu Murai, Uozu, all of Japan

[73] Assignee: Yoshida Kogyo K.K., Tokyo, Japan

[21] Appl. No.: 411,185

[22] Filed: Sep. 19, 1989

Related U.S. Application Data

[63] Continuation of Ser. No. 112,407, Oct. 26, 1987, abandoned.

[30] Foreign Application Priority Data

Oct. 27, 1986 [JP] Japan ................... 61-253689

[51] Int. Cl.$^5$ ............... H02P 7/29; G05B 11/28
[52] U.S. Cl. ..................... 318/599; 318/466
[58] Field of Search ............. 318/432, 433, 434, 466, 318/467, 468, 599, 811

[56] References Cited

U.S. PATENT DOCUMENTS

| | | | |
|---|---|---|---|
| 4,233,549 | 11/1980 | Dighe | 318/317 |
| 4,249,116 | 2/1981 | Hieda | 318/439 X |
| 4,383,245 | 5/1983 | Cooley et al. | 318/599 X |
| 4,447,767 | 5/1984 | Holt | 318/139 |
| 4,529,920 | 7/1985 | Yoshida et al. | 318/466 |
| 4,587,605 | 5/1986 | Kouyama et al. | 318/811 X |
| 4,673,848 | 6/1987 | Hagiwara et al. | 318/266 |

FOREIGN PATENT DOCUMENTS

| | | |
|---|---|---|
| 58-210270 | 7/1983 | Japan . |
| 1425490 | 2/1976 | United Kingdom . |
| 1546260 | 12/1977 | United Kingdom . |
| 2149242A | 6/1985 | United Kingdom . |

Primary Examiner—Bentsu Ro
Attorney, Agent, or Firm—Hill Van Santen Steadman & Simpson

[57] ABSTRACT

A method for controlling a torque of a door opening and closing motor for an automatic door is improved in that the door opening and closing motor is such motor that a rotary torque therein is generated on the basis of control pulses applied to that motor from a control unit, the rotary torque is regulated by changing a total pulse width of the control pulses rising in one repetition cycle, and thereby an acceleration of the motor can be controlled. In one preferred mode of embodiment of the invention, each of the control pulse has a fixed pulse width, and th total pulse width is changed by varying the number of the control pulse rising in one repetition cycle.

5 Claims, 6 Drawing Sheets

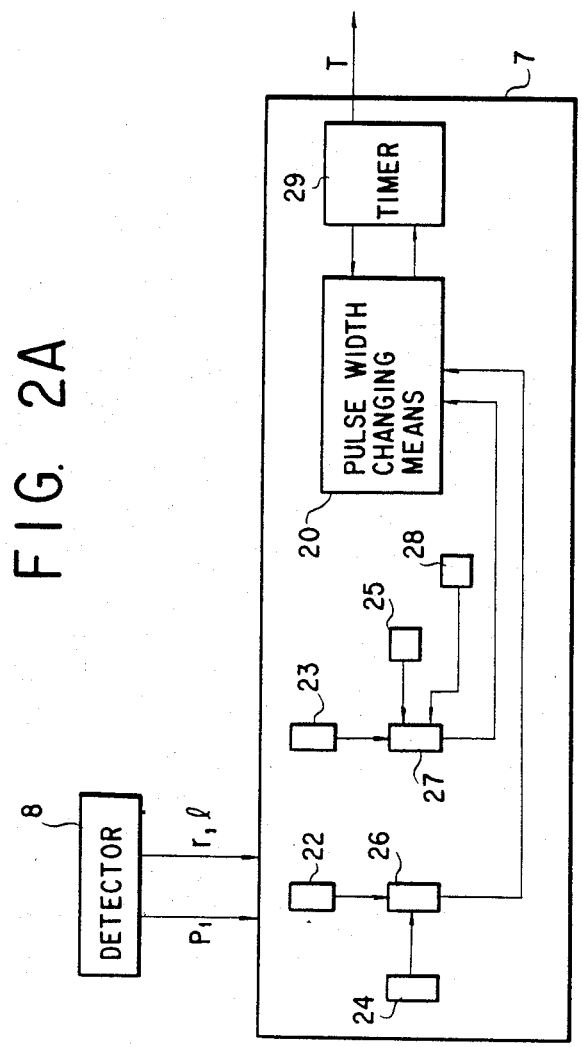

METHOD AND APPARATUS FOR CONTROLLING TORQUE OF A DOOR OPENING AND CLOSING MOTOR FOR AN AUTOMATIC DOOR

This is a continuation of application Ser. No. 112,407, filed Oct. 26, 1987 now abandoned.

BACKGROUND OF THE INVENTION

The present invention relates to a method and apparatus for controlling a door moving distance passed by an opening and closing door of an automatic door during the period when the door reaches the highest speed starting from its stop condition, a door moving distance passed by the door during the period when the door is braked and stopped starting from the condition where the door is opening or closing at the highest speed, or a total door moving distance passed by the door during the period when the door is braked and reversed to the opposite direction and then reaches the highest speed starting from the condition where the door is opening or closing at the highest speed, by regulating torque of the door opening and closing motor.

In an automatic door, a belt is engaged with a drive pulley that is driven by a motor and a driven pulley, a door is connected to this belt, and the door operates to open or close by driving the motor into normal rotation or into reverse rotation. For instance, as shown in FIG. 8, at a closing stop point if a human body detection signal is input to a control unit of the automatic door, the door is accelerated from a stop condition up to the highest speed, then while maintaining that speed the door operates to open at the highest speed up to an opening deceleration point, when the door has reached the opening deceleration point it is decelerated until it stops, and thereafter it operates again to open at a low speed until it reaches an opening stop point.

Then, after the door has been kept still for a predetermined period of time at the opening stop point, it begins to move in the closing direction and is accelerated up to the highest speed, then while maintaining that speed it operates to close at the highest speed up to a closing deceleration point, when it has reached the closing deceleration point, it is decelerated until it stops, and thereafter it operates to close at a low speed up to a closing stop point.

On the other hand, the automatic door is designed such that if the door detects a passing body such as a human body or it collides against a passing body when it is operating to close at the highest speed, then the door immediately operates to open at the highest speed, in other words, it performs a reversing operation.

While the automatic door performs an accelerating operation from a stop condition until the highest speed is attained, a decelerating operation by braking, and reversing a operation for moving a door in the opposite direction after braking as described above, if a door moving distance $L_1$ passed by the door during acceleration is too short, then the door abruptly reaches the highest speed and hence "hiccup phenomena" (unsmooth movements) would occur upon starting of the door, on the contrary if the door moving distance $L_1$ is too long, then the operation of the door would become slow and dull, and therefore, it is necessary to select the door moving distance $L_1$ upon acceleration to an optimum distance by adjusting the weight of the door, a running resistance and the like.

Also, if a door moving distance $L_2$ passed by the door during deceleration is too short, then the door would be braked abruptly and hence "hiccup phenomena" (unsmooth movements) would occur or abnormal forces would act upon various portions of the door; resulting in damages, whereas if the door moving distance $L_2$ is too long, then the operation of the door would become slow and dull, and therefore, it is necessary to select the door moving distance $L_2$ upon deceleration also to an optimum door moving distance by adjusting a weight of the door, running resistance and the like.

Furthermore, during reversing operation when the door has collided against a passing body, it is necessary to quickly decelerate and stop the door and thereafter immediately accelerate it up to the highest opening speed.

As described above, it is necessary to control the torque of a door opening/closing motor so that a door moving distance passed by the door when the door is accelerated or decelerated during accelerating operation, decelerating operation or reversing operation, may become an optimum distance.

SUMMARY OF THE INVENTION

The present invention has been made in view of the aforesaid circumstances, and its object is to provide a method for controlling torque of a door opening and closing motor for an automatic door, in which a door moving distance passed by the door when the door is accelerated or decelerated during accelerating operation, decelerating operation or reversing operation can be easily controlled.

According to one feature of the present invention, in a method for controlling torque of a door opening/closing motor for an automatic door, the motor is such motor that a rotary torque therein is generated on the basis of control pulses applied to that motor from a control unit, the rotary torque is regulated by changing the total pulse width of the control pulses rising in one repetition cycle, and thereby an acceleration or deceleration during accelerating operation, decelerating operation or reversing operation can be controlled in a simple manner.

According to another feature of the present invention, in the above-featured method, each of the control pulses has a fixed pulse width, and the total pulse width is changed by varying the number of the control pulses rising in one repetition cycle.

The above-mentioned and other objects, features and advantages of the present invention will become more apparent by reference to the following description of one preferred embodiment of the invention taken in conjunction with the accompanying drawings.

BRIEF DESCRIPTION OF THE DRAWINGS

In the accompanying drawings:

FIGS. 1 through 7 show one preferred embodiment of the present invention;

FIG. 1 is a schematic view of an automatic door;

FIG. 2A is a block diagram of a control circuit;

FIG. 3 is a diagrammatic representation of control pulses;

FIG. 5 is an operation diagram during accelerating operation;

FIG. 6 is an operation diagram during decelerating operation;

FIG. 7 is an operation diagram during reversing operation; and

DESCRIPTION OF THE PREFERRED EMBODIMENT

Figure 1:
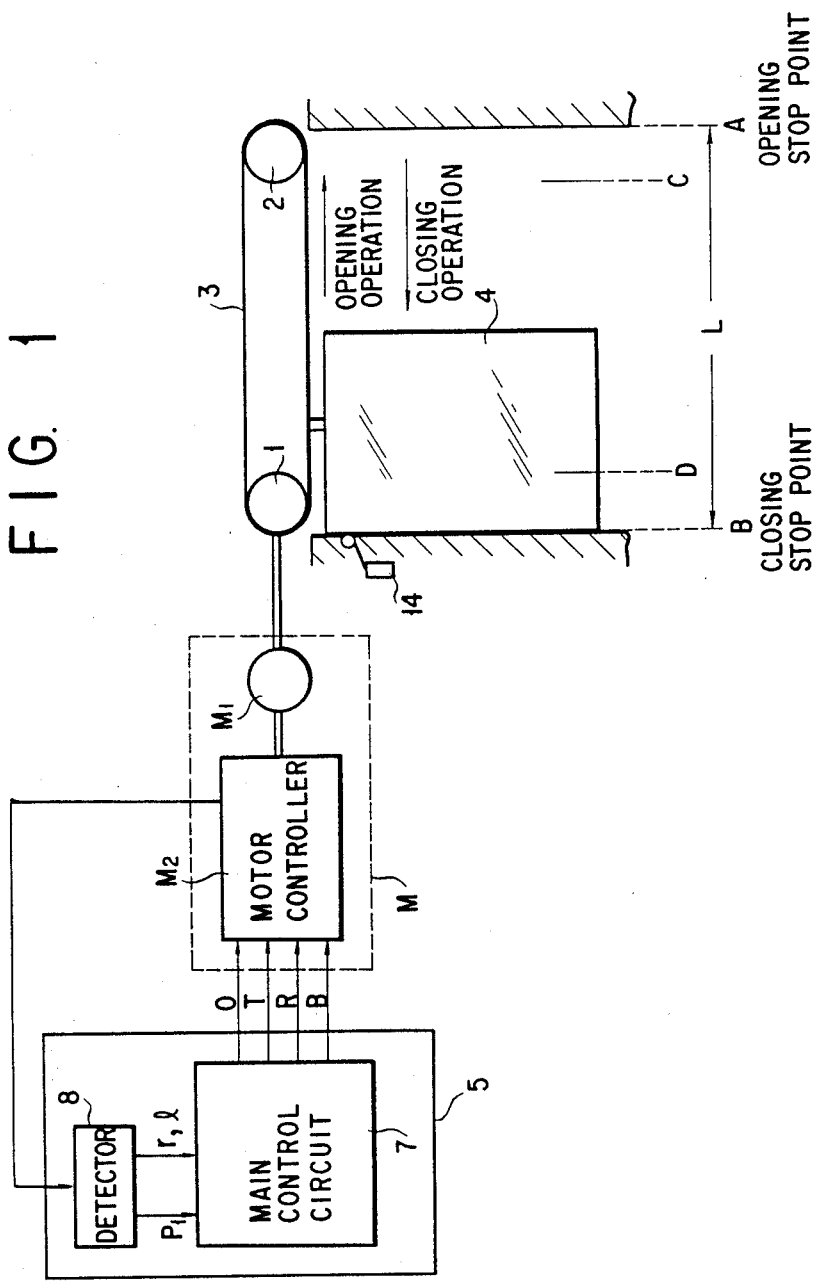

FIG. 1 is a schematic view of an entire automatic door system, in which a door 4 is connected to a belt 3 engaged with a drive pulley 1 that is driven by a motor M and a driven pulley 2. By rotationally driving the motor M in a normal direction as well as in a reverse direction, the door 4 is made to open and close so that it is reciprocated between an opening stop point "A", where a right edge (as viewed in FIG. 1) of the door 4 is stopped, and a closing stop point "B", where a left edge of the door 4 is touched and stopped. In addition, an opening deceleration point C and a closing deceleration point D are preset on the basis a distance L between the stop points A and B. In an opening (or closing) operation, until the right (or left) edge of the door 4 reaches the opening (or closing) deceleration point C (or D), the door 4 performs a high speed opening (or closing) operation, and subsequently it performs a low speed opening (or closing) operation.

The above-mentioned motor M consists of a motor main body M1 and a motor controller M2 for controlling movement of the motor main body, and the motor M is controlled by a control unit 5. This control unit 5 includes a main control circuit 7 for outputting an ON/OFF signal O for the motor, a torque control signal T, a normal/reverse rotation signal R and a brake signal B to the motor controller M2 in the motor M, and a detector 8 for outputting counting clock pulses $P_1$ which are proportional in number to a distance of movement of the door 4, and an open signal "r" and a close signal "l" for discriminating whether an opening operation or a closing operation. The detector 8 consists of sensors and a direction discriminator as shown, for instance, in Japanese Patent Application Laid-open Specification No. 58-210270(1983).

The above-mentioned motor main body M1 is either an AC motor or a DC motor, which is controlled by the signals O, T, R and B issued from the above-described control unit 5 so as to be switched ON or OFF, to be rotated in a normal direction or in a reverse direction, or to be braked, and a rotary torque generated in the motor is PWM-controlled (pulse-width-modulation-controlled).

In particular, a plurality of (for instance, eight) pulses output from a timer 29 in a main control circuit 7 as shown in FIG. 2A constitute one repetition cycle, the total pulse width of pulses arising during the one repetition cycle and sent from the main control circuit 7 to the motor controller M2 in the motor M is regulated by presetting the number of pulses rising during this one repetition cycle to an any arbitrary number in pulse width changing means 20 in the main control circuit 7, and thereby the rotary torque generated in the motor main body M1 can be controlled.

Figure 3:
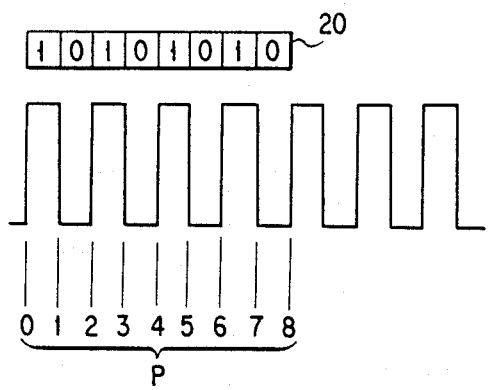
Figure 4A:
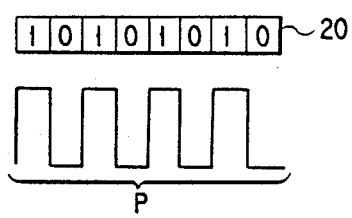
FIGS. 4A, 4B and 4C are diagrammatic representations of control pulses under different control conditions.
Figure 4B:
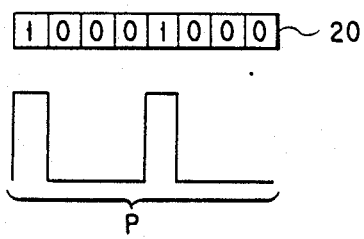
Figure 4C:
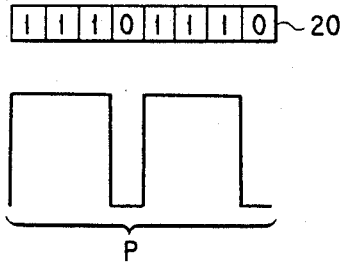
Figure 5:
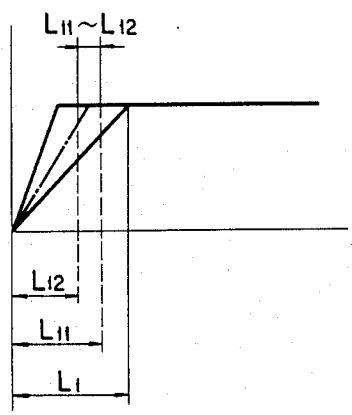
Figure 6:
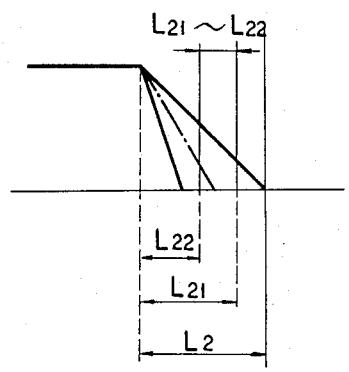

For instance, in order to classify the torque generated in the motor main body M1 into eight steps of "0" to "8", circuit design is made such that up to eight consecutive pulses issued from the timer 29 may form one repetition cycle as shown in FIG. 3, and in practice the timer 29 generates pulses on the basis of a pattern preset in the pulse width changing means 20. As a result, the total pulse width of the pulses rising during one repetition cycle and input to the motor M can be varied, for instance, as shown in FIGS. 4A, 4B and 4C. If the total pulse width of the pulses rising during one repetition cycle is enlarged, then the rotary torque generated in the motor M becomes large, and hence the acceleration upon increasing the respectively motor speed can be increased, whereas if the total pulse width is reduced, then the rotary torque becomes small, and hence the acceleration upon increasing a motor speed can be decreased. Or else, in the case of deceleration, it is only necessary to generate a braking torque that is reversed in the opposite direction in response to the brake signal.

Figure 2B:
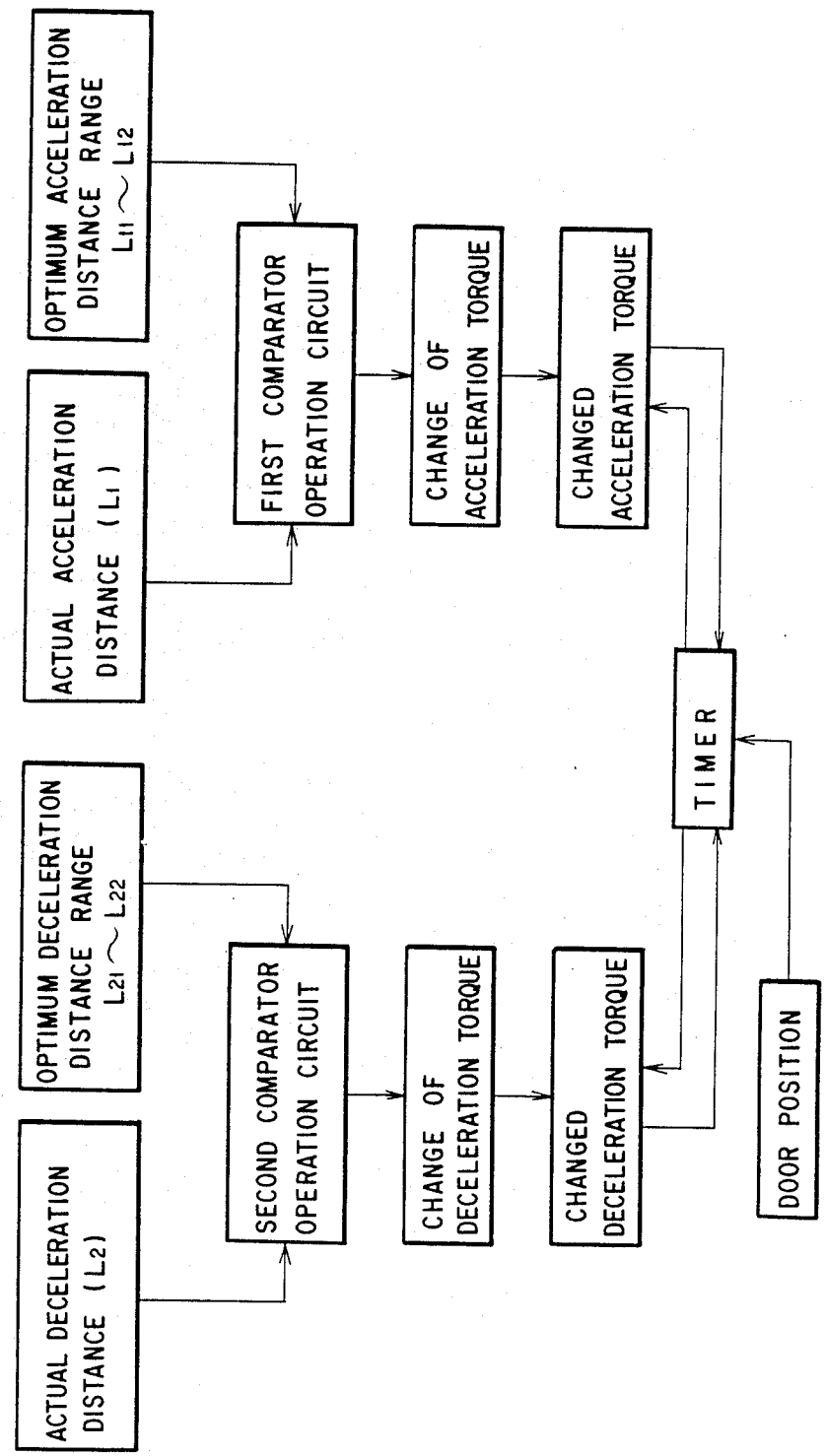
FIG. 2B is a flow chart indicating a control process in the control circuit.

As shown in FIGS. 2A and 2B, in the above-described main control circuit 7 are provided an acceleration distance measuring circuit 22 for measuring a door moving distance $L_1$ passed by the door 4 during the period when the door 4 reaches the highest speed starting from a stop condition on the basis of counting clock pulses $P_1$ issued from the detector 8, and a deceleration distance measuring circuit 23 for measuring a door moving distance $L_2$ passed by the door 4 during the period when the door stops starting from the highest speed condition. These door moving distances $L_1$ and $L_2$ are respectively compared with an optimum acceleration distance range $L_{11} \sim L_{12}$ set in a first setter 24 and an optimum deceleration distance range $L_{21} \sim L_{22}$ set in a second setter 25, as comparatively operated in a first comparator operation circuit 26 and in a second comparator operation circuit 27, respectively, and if necessary, according to the results of operation, a one-step increase signal or a one-step decrease signal is output from the comparator operation circuits 26 and/or 27 to the pulse width changing means 20 to automatically enlarge or reduce the total pulse width of the rising pulses by one step. The changed torque control signal is applied to the motor controller M2 in the form of pulses with the aid of the timer 29, thereby a rotary torque generated in the motor main body M1 is enlarged or reduced, and the acceleration of the door 4 can be regulated.

Since the torque control is effected in the above-described manner, when the door 4 is actuated to be opened and closed while varying a rotary torque of a motor by changing a total pulse width of the pulses rising in one repetition cycle, the acceleration is regulated by changing the total pulse width each time by one step on the basis of an actual acceleration door moving distance $L_1$ and an actual deceleration door moving distance $L_2$, the door 4 is again actuated to be opened and closed and thereby the acceleration is regulated again by changing the total pulse width. By automatically repeating these operations a plurality of times, the acceleration door moving distance $L_1$ and the deceleration door moving distance $L_2$ can be brought into the optimum ranges $L_{11} \sim L_{12}$ and $L_{21} \sim L_{22}$, respectively.

Here, the reason why the optimum door moving distance is defined to have a certain tolerance (a range) is because the acceleration would change discretely step by step due to the fact that the total pulse width changes discretely step by step, hence the practical acceleration door moving distance would change discretely with a given increment, and so, there is a fear that the practical acceleration door moving distance may not coincide with an optimum door moving distance but may oscillate about the door moving optimum distance.

It is to be noted that upon deceleration, pulse control is effected in such manner that rotary torque directed in the opposite direction to that upon acceleration may be generated or a rotary torque adapted to stop the motor may be generated.

Figure 7:
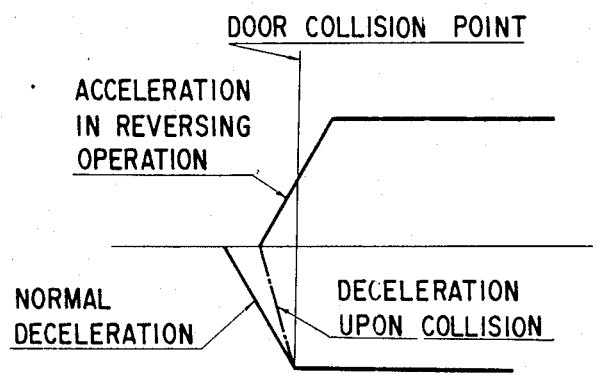
Figure 8:
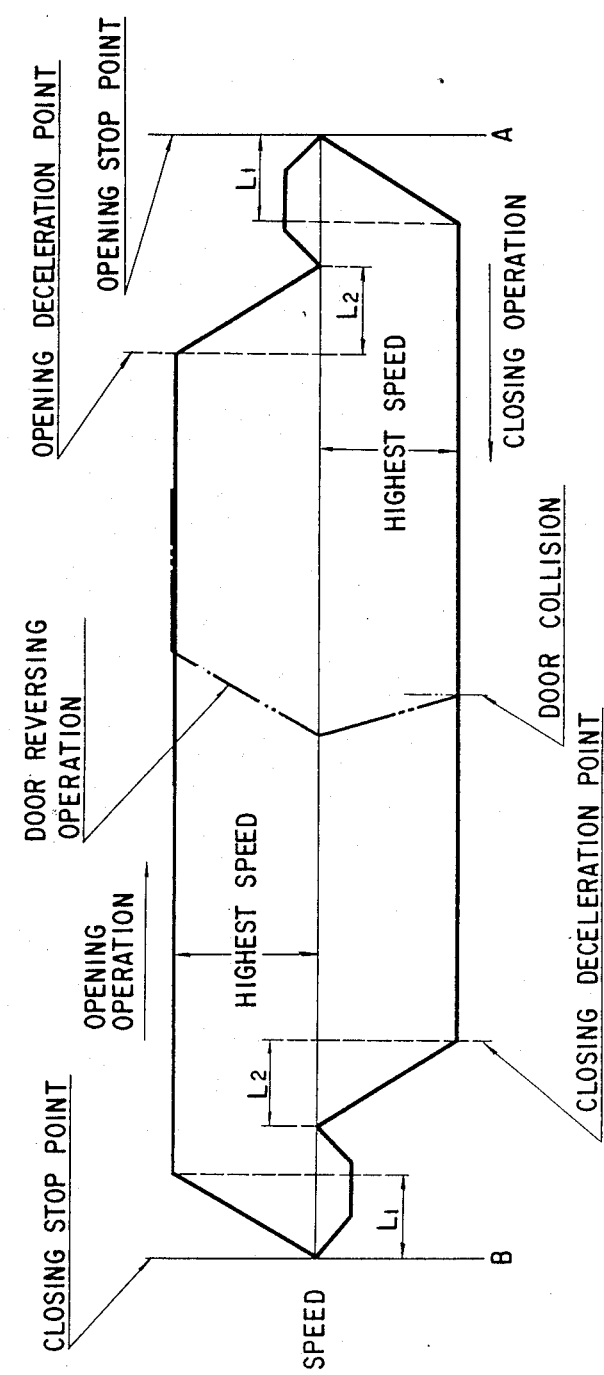
FIG. 8 is an operation diagram for general door opening/closing operations in a conventional automatic door.

In addition, within the above-described main control circuit 7 there is provided a collision detector circuit 28 which can detect on the basis of the counting clock pulses $P_1$ issued from the detector 8 that the door 4 has collided against a passing body, and when this collision detector circuit 28 has detected the collision, it outputs an acceleration increase signal to the above-described second comparison operation circuit 27, which then outputs a signal for increasing the total pulse width of rising pulses by one step or by a plurality of steps to the pulse width changing means 20, thereby a negative rotary torque generated in the motor M is increased to increase an absolute value of a negative acceleration upon deceleration so that the motor M can be stopped more quickly than upon normal deceleration as shown by a dash-dot line in FIG. 7. Thereafter, the speed of the door in the opposite direction is increased up to the highest speed at a similar acceleration to a normal acceleration period, and thus the door 4 performs a reversing operation.

If the control is effected in the above-described manner, the door would stop immediately after it has collided against a passing body, and hence it can quickly achieve reversing operation.

As described in detail above, according to the present invention, since an acceleration of a drive motor can be controlled through a simple operation of changing a total pulse width of control pulses in one repetition cycle, an acceleration of a door upon accelerating operation, upon decelerating operation and upon deceleration and acceleration in reversing operation can be controlled in a simple manner so that the door may be accelerated or decelerated while it is passing an optimum door moving distance.

What is claimed is:

1. A method of controlling torque of a door opening and closing motor for an automatic door, said motor being such a motor that a rotary torque therein is generated on the basis of control pulses applied to said motor from a control unit, its rotary torque being regulated by changing a total pulse width of said control pulses rising in one repetition cycle thereby controlling an acceleration of said motor, said method comprising the steps of:
   (I) in an accelerating operation of the door;
   (I-a) measuring a first door moving distance $L_1$ passed by the door during a period when the door reaches its highest speed condition starting from its stop condition;
   (I-b) comparing said first door moving distance $L_1$ with an optimum acceleration distance range $L_{11}$–$L_{12}$ set in said control unit;
   (I-c) changing a total pulse width of said control pulses arising in one repetition cycle on the basis of a result of said comparing step (I-b); and
   (I-d) accelerating the door by applying the control pulses as changed in said changing step (I-c) to said motor upon a next door accelerating operation; (II) in a decelerating operation of the door;
   (II-a) measuring a second door moving distance $L_2$ passed by the door during a period when the door once stops after starting from its highest speed condition;
   (II-b) comparing said second door moving distance $L_2$ with an optimum deceleration distance range $L_{21}$–$L_{22}$ set in said control unit;
   (II-c) changing a total pulse width of said control pulses arising in one repetition cycle on the basis of a result of said comparing step (II-b); and
   (II-d) decelerating the door by applying the control pulses as changed in said changing step (II-c) to said motor upon a next door decelerating operation; whereby the door accelerating and decelerating operations can be always regulated in an optimum range.

2. A method for controlling torque of a door opening and closing motor as claimed in claim 1, wherein each said control pulse has a fixed pulse width, and said total pulse width is changed by varying the number of said control pulses rising in one repetition cycle.

3. An apparatus for controlling torque of a door opening and closing motor for an automatic door in which said motor is such a motor that the torque thereof is generated on the basis of controlling the total pulse width applied to said motor from a control unit, comprising means for regulating the total pulse width by changing the total pulse number of control pulses occurring in one cycle and means for determining whether acceleration of said motor is in a predetermined range, said acceleration determining means supplying change total pulse number signals to said regulating means when acceleration is not in said predetermined range, whereby acceleration of said motor is controlled.

4. An apparatus as claimed in claim 3, wherein the apparatus is adapted so that each control pulse has a fixed pulse width, and said total pulse width is changed by varying the number of said control pulses occurring in one cycle.

5. An apparatus as claimed in claim 3, wherein said regulating means comprises:
   (a) a main control circuit including therein an acceleration distance measuring circuit, a deceleration distance measuring circuit, a first setter for setting an optimum deceleration distance range, a first comparator operation circuit, a collision detector circuit, a pulse width changing means, and a timer;
   (b) a detector for outputting a door open signal, a door close signal and for counting clock pulses which are proportional in number to a distance of movement of the door to said main control circuit; and
   (d) a motor controller for controlling movement of the motor by receiving output signal from said main control circuit.

* * * * *